United States Patent
Sequeira et al.

(10) Patent No.: US 10,239,000 B2
(45) Date of Patent: Mar. 26, 2019

(54) DEVICE FOR FILTERING ROLLING OIL

(71) Applicant: FIVES DMS, Noyelles-les-Seclin (FR)

(72) Inventors: David Sequeira, Wavrin (FR); Cedric Bassez, Lievin (FR); Conrad Ernst De La Graete, Villeneuve d'Ascq (FR)

(73) Assignee: FIVES DMS, Moyelles-les-Seclin (FR)

( * ) Notice: Subject to any disclaimer, the term of this patent is extended or adjusted under 35 U.S.C. 154(b) by 17 days.

(21) Appl. No.: 15/512,626

(22) PCT Filed: Oct. 27, 2015

(86) PCT No.: PCT/FR2015/052885
§ 371 (c)(1),
(2) Date: Mar. 20, 2017

(87) PCT Pub. No.: WO2016/066943
PCT Pub. Date: May 6, 2016

(65) Prior Publication Data
US 2017/0291126 A1    Oct. 12, 2017

(30) Foreign Application Priority Data
Oct. 28, 2014   (FR) ...................... 14 60339

(51) Int. Cl.
*B01D 29/96*    (2006.01)
*B01D 29/52*    (2006.01)
*B01D 35/30*    (2006.01)

(52) U.S. Cl.
CPC .............. *B01D 29/96* (2013.01); *B01D 29/52* (2013.01); *B01D 35/30* (2013.01); *B01D 2201/0446* (2013.01); *B01D 2201/30* (2013.01)

(58) Field of Classification Search
CPC ........ B01D 29/96; B01D 29/52; B01D 35/30; B01D 2201/0446; B01D 2201/30
See application file for complete search history.

(56) References Cited

U.S. PATENT DOCUMENTS 3,341,023 A *   9/1967   Seter .................... B01D 29/15
                                                          210/237
4,237,011 A     12/1980   Acosta
(Continued)

FOREIGN PATENT DOCUMENTS

| CN | 1546900 A   | 11/2004 |
| CN | 203154922 U | 8/2013  |
| CN | 203355436 U | 12/2013 |

OTHER PUBLICATIONS

International Search Report, dated Mar. 1, 2016, from corresponding PCT application.

*Primary Examiner* — Thomas M Lithgow
(74) *Attorney, Agent, or Firm* — Young & Thompson

(57) ABSTRACT

A device for filtering oil, including: a tank including an oil inlet and a cover; an at least one removable plate, inside the tank, that can be removed from the tank via the upper opening of the cover. The at least one plate removably receives filtering cartridges. The plate is hollow, forming a collector for the oil filtered by the cartridges of the plate. The plate includes an outlet for filtered oil removably connected to a corresponding outlet of the tank via a connector. The connection includes a first portion rigidly connected to the plate and a second portion rigidly connected to the tank, that are capable of mutually cooperating via a seal in order to provide a sealed connection between the oil outlet of the plate, and the corresponding outlet of the tank, and in order to allow maintenance operations to be performed without intervening in the tank.

18 Claims, 13 Drawing Sheets

(56) References Cited

U.S. PATENT DOCUMENTS 5,193,377 A     3/1993   Sendzimir et al.
5,471,859 A    12/1995   Sendzimir et al.

* cited by examiner

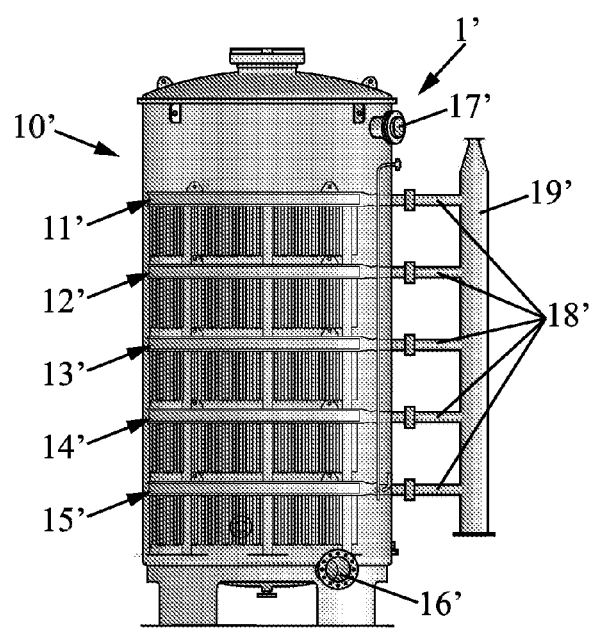
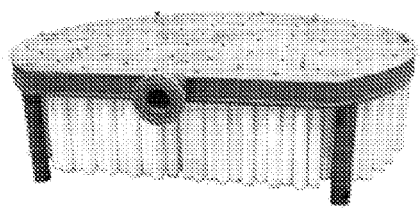
FIG. 1 (E.T)  FIG. 1a

DEVICE FOR FILTERING ROLLING OIL

The invention concerns a rolling oil filtering device, of plates type, a recycling and rolling oil filtering installation provided with such a filtering device.

The field of the invention is the one of rolling oil recycling in cold-rolling mills, and more particularly rolling-mills "Senzimir", in particular with twenty cylinders, known under the name "20-Hi" for the person skilled in the art; an example of a such twenty cylinders rolling mill is illustrated in documents U.S. Pat. No. 5,193,377 and U.S. Pat. No. 5,471,859. In a such rolling mill, the cylinders are arranged in an inferior group and in a superior group; more precisely, these groups present a symmetrical structure and each comprises ten cylinders among which: one working cylinder, two first intermediary cylinders, three second intermediary cylinders, four support cylinders, or support rollers, which are outside the arrangement.

In a rolling mill, and particularly, in a twenty cylinders rolling mill, the rolling operations are carried out in projecting oil on the cylinders and the strip. This operation of lubrication and/or of cooling is carried out by a recycling installation which comprises, successively, arranged between dirty oil outlet of the rolling mill and an inlet for filtered oil, the circuit comprising:
- a dirty oil tank,
- a cartridge filtering system,
- a clean oil tank.

A first pump system, in the upper part of the filtering system following the oil flow direction, is associated with the filtering system and allows bringing the oil to the filtering system.

A second pump system, located in the lower part of the filtering system, allows aspirating oil through the filtering medium and to push the oil thus recycled to the clean oil tank.

A third pump system, located in the lower part of the clean oil tank, allows bringing the oil to rolling mill. Such a general architecture of filtering and recycling installation is known from document CN 203355436U, and is industrially done for the 20 cylinders rolling mill since the 1970's. Usually, the installation can also comprise exchangers intended to control the recycled oil temperature, and controlling valve allowing the control of the fluid flow rate before its entrance in the rolling mill.

Since that date, it is known to use, for the filtering device, several filtering devices of the plate type, usually known, for the person skilled in the art, under the name "Supamic Filter" of the name of its original manufacturer, and arranged on the circuit in a way to carry out a parallel oil filtration. Such a plate filtering device is schematically depicted on FIG. 1 of document CN 203355436U, identified by reference 5.

Document CN 203154922U describes in more details the structure of a plate filtering device typically used for the filtration of the rolling mills Sendzimir since the 1970's.

Such a filtering device comprises a tank, typically cylindrical inside which several "plates" are stacked, removably, distributed along the tank height, and stacked one on another with feet systems. Each of the plate elements is a hollow element on which a big number of filtering cartridges are secured, in parallel, typically by screwing the upper end of the cartridge on the corresponding threaded part of the plate.

The tank comprises an opening for the dirty oil, the filtration being carried out through the filtering medium of the cartridge from the outside to the inside, the oil filtered by the cartridge being collected in the plate, which is a hollow element, before being conducted to a plate outlet for clean oil. The oil outlets of the different plates are respectively connected in a tight way with openings distributed along the tank height through flange sets.

After a certain time of operation, it is necessary to replace the cartridges of the filtering device; according to the current proceeding, the operator begins to open the cover, at the upper end of the tank, than remove the different plates, one by one with help of a lifting system, from the highest plate until the last plate in the bottom of the tank. Once the plate is removed out of the tank, the different cartridges can be unthreaded and replaced. However, according to the inventor's ascertainments, in the devices of the prior art, for each plate, and before the removing operation and lifting the plate, the operator must necessarily go down in the tank to unthread the screw of flange set and remove the seals between the oil outlet of the plate and the corresponding opening of the tank.

The purpose of the present invention is to overcome the above mentioned inconvenient, in providing a filtering device of plates type whose maintenance, in particular the replacement operations of the filtering cartridges is greatly facilitated.

Other purposes and advantages of the invention will readily appear from the following description, provided as non-limitative example.

Thus the invention concerns firstly an oil filtering device comprising an oil circuit comprising:
- a tank comprising an inlet for an oil to be filtered, and a cover,
- at least one plate element internal to said tank, removable, able to be removed from the tank by the upper opening of the cover, said at least one plate element removably receiving filtering cartridges, said plate element, hollow constituting a manifold for the oil filtered by the cartridges of said plate element, said plate element comprising a filtered oil outlet removably connected with a corresponding outlet of the tank through a connector.

According to the invention, said connector comprises a first part integral with said at least one plate element and a second part integral with the tank, able to mutually cooperate through a seal to ensure a sealing connection between the oil outlet of said plate element, and the corresponding outlet of the tank.

According to a first embodiment, the two parts of said connector are arranged such that the sealing connection of the two parts of the connector, and on the contrary their disconnection, is ensured only by the vertical displacement of said plate element within said tank. Alternatively, according to a second embodiment, two parts of the connector are movable one to another, actuable from the outside of the tank, whereas said corresponding plate element is in a stationary position in the tank, able to switch from a first disconnection position, allowing the lifting and the removal of said plate element, to a second connection position wherein the two parts cooperate with the seal to ensure a sealing connection between the oil outlet of said plate element and the corresponding outlet of the tank.

In both cases, first or second embodiment, the operations of disconnection or connection can be advantageously carried out without the operator's intervention in the tank, in contrary to the prior art known from the applicant.

According to optional features of the invention, according to the first embodiment, taken alone or in combination:
- in said second connection position of said connector the compression of the seal ensuring the tight between the first part and the second part of the connector is ensured only by use of the mass of said plate element and of the filtering cartridges that it supports;

the device has a adjusting system of mass repartition of said plate element on the seal;

the first part and the second part of said connector comprise respectively two conduct sections, of vertical axis, interpenetrating, through said seal, in said connection position of said connector, and, wherein the first part integral with said plate element comprises a conduct section vertically extending toward the bottom from the underneath of said plate element, having a lower mouth, said second part comprising a conduct section vertically extending toward the top, having an upper mouth, and such that, in said connection position of said connector, the two conduct sections cooperate tightly, said first part of said integral connector of said plate element being located above said second part of said integral connector of the tank;

the device has vertical guide means arranged between the tank and said plate element, arranged to ensure the good relative positioning of the two parts of the connector when said plate element is getting down in said tank;

the guide means comprise several guide tracks, oriented vertically in the tank and secured to this last, and guiding parts integral with said plate element, intended to cooperate with said guide tracks;

the guiding parts integral with said plate comprise rollers intended to be inserted in the internal volume of the guide tracks;

the device has stops intended to stop the vertical stroke of said plate element in said tank and at a corresponding level allowing the sealing connection between the two parts of the connector;

the device has several plate elements stacked in the internal volume of the tank, the connection of each plate element with the corresponding tank outlet being performed by said connector such that the sealing connection, and conversely their disconnection, is ensured only by the vertical movement of said plate element in said tank, the positions of the different connectors corresponding to the different plate elements angularly offset around the tank's axe.

According to an embodiment of a device with several plate elements:

the different plates elements of the different levels share the same guide tracks, the guide parts integral with said plate elements, particularly the rollers, are of increasing dimensions, from said plate element of the highest level, toward said plate element of the lowest level, the stops intended to stop the stroke of the different plate elements comprise section of reductions, within the guide tracks, each of the section of reductions being intended to ensure the locking of a guiding means belonging to a specific plate element and in a way such that a guide part of smaller dimension goes through the section of reduction, without locking said specific plate element.

According to an embodiment, the rollers are arranged diametrically opposed on said plate element and intended to cooperate with the two guide tracks of said tank, said stops cooperating with the rollers of said plate such to permit a pivoting of said plate element around the roller's axe substantially diametrically to the plate element.

Advantageously, the mass repartition adjustment device of said plate element on the seal can use this possibility of pivoting and thus comprises an adjustable support system between said plate element and a stationary part of the tank, arranged diametrically opposed on said plate element from said connector.

The invention further concerns a recycling and rolling oil filtering installation of a rolling mill comprising successively:

a dirty oil tank,
an oil filtering system comprising one or more devices according to the invention, and
a clean oil tank.

The invention will be better understood from the following description, provided with the drawings in annex among which:

FIG. 1 is a view of an oil filtering device for a rolling mill, with five plates as known from the prior art;

FIG. 1*a* is a photography of a plate element of the device of FIG. 1;

FIG. 1*b* is a partial view, in transparency, of the device of FIG. 1, depicting more particularly the connection between the plates through flange sets according to the prior art, FIG. 2 is a view of the device of the invention according to an embodiment, FIG. 3 is a view in details of FIG. 2, according to a vertical sectional plane, and depicting a connector according to the invention allowing the realization of a seal connection, and without an operator's intervention in said tank, FIG. 4 is a sectional view of the device of FIG. 2, according to a vertical sectional plane, FIG. 5 is a sectional view of the device of FIG. 2, according to a vertical sectional plane, depicting the guide tracks of the plate elements;

Figure 9:
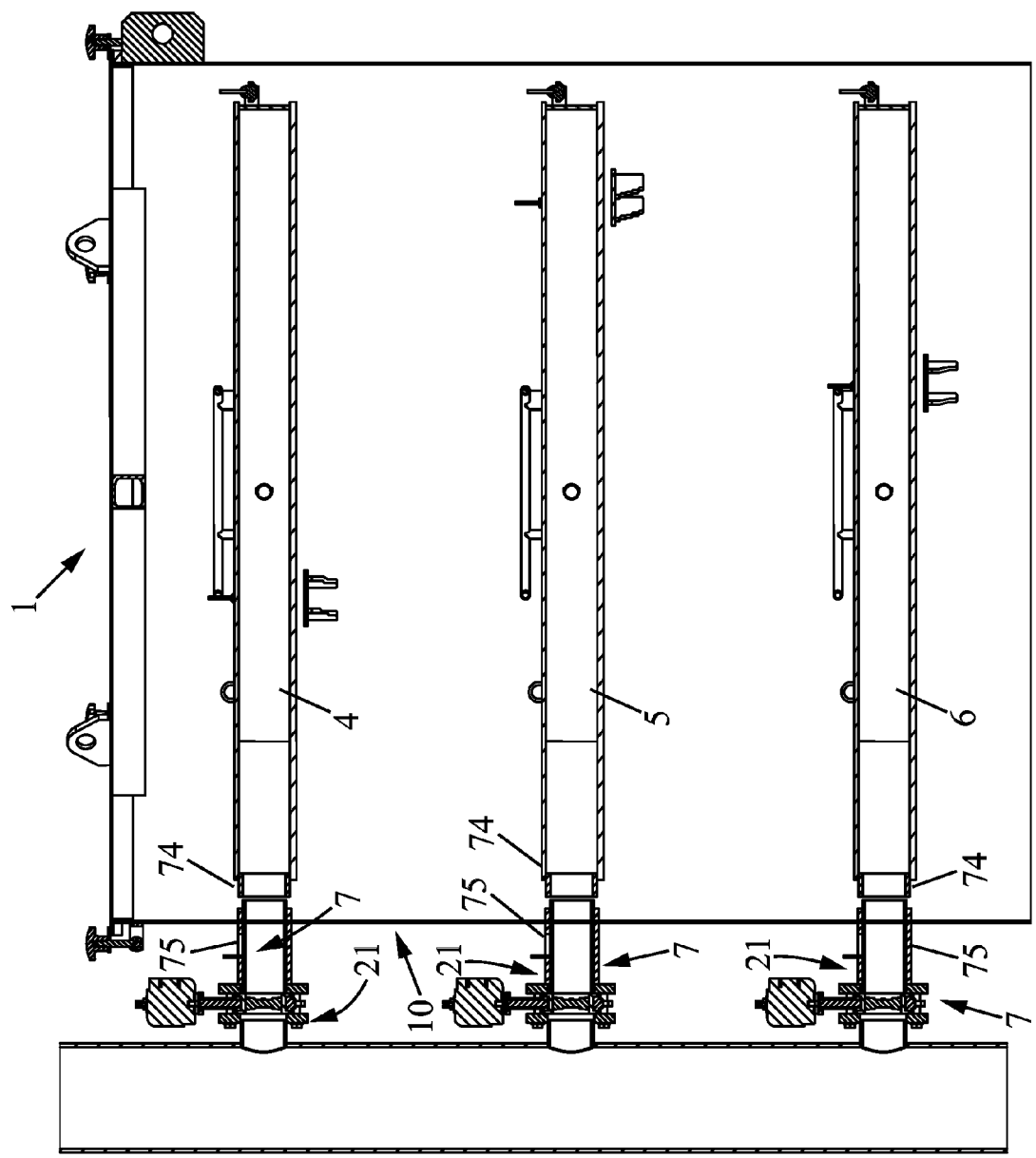
Figure 10:
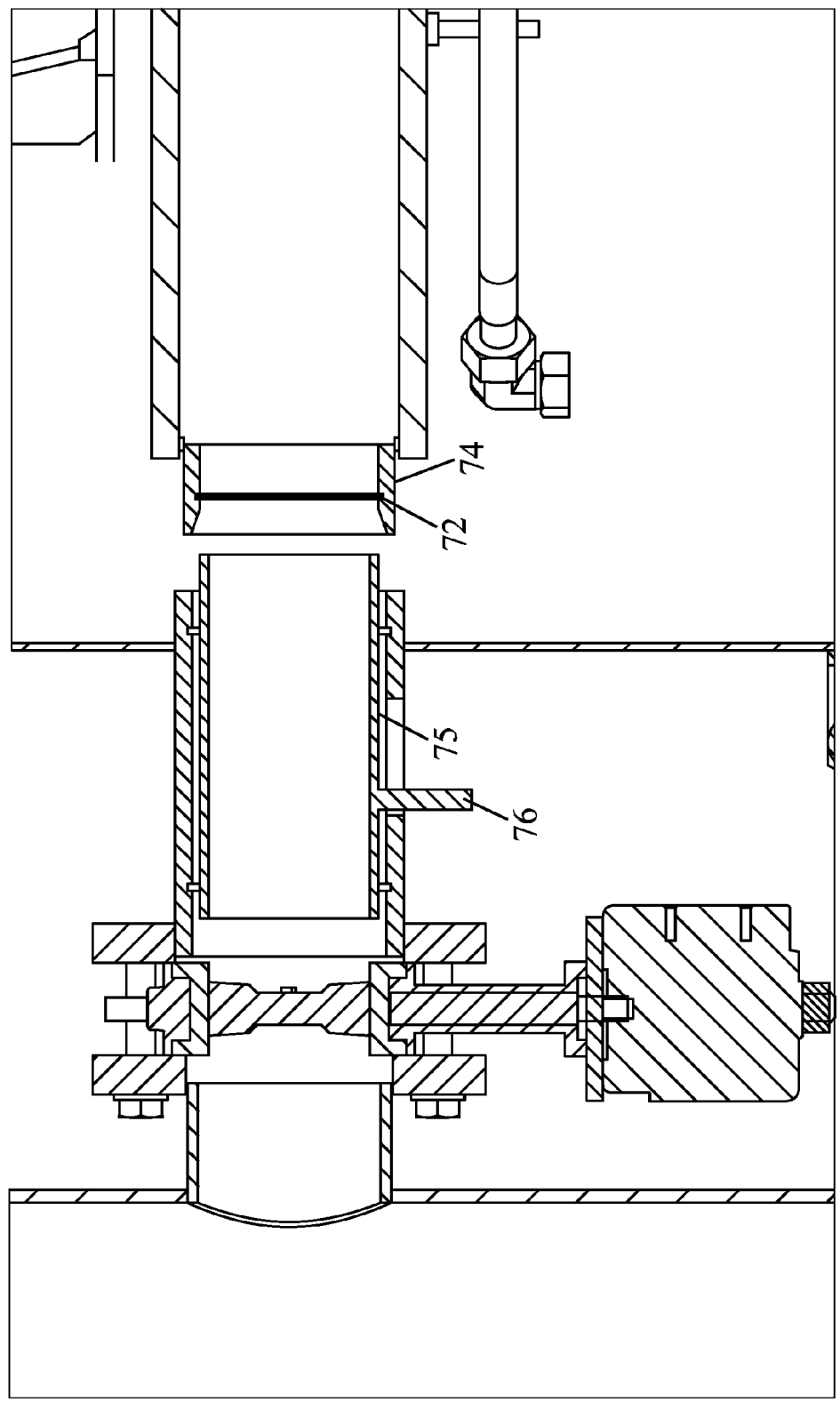
Figure 11:
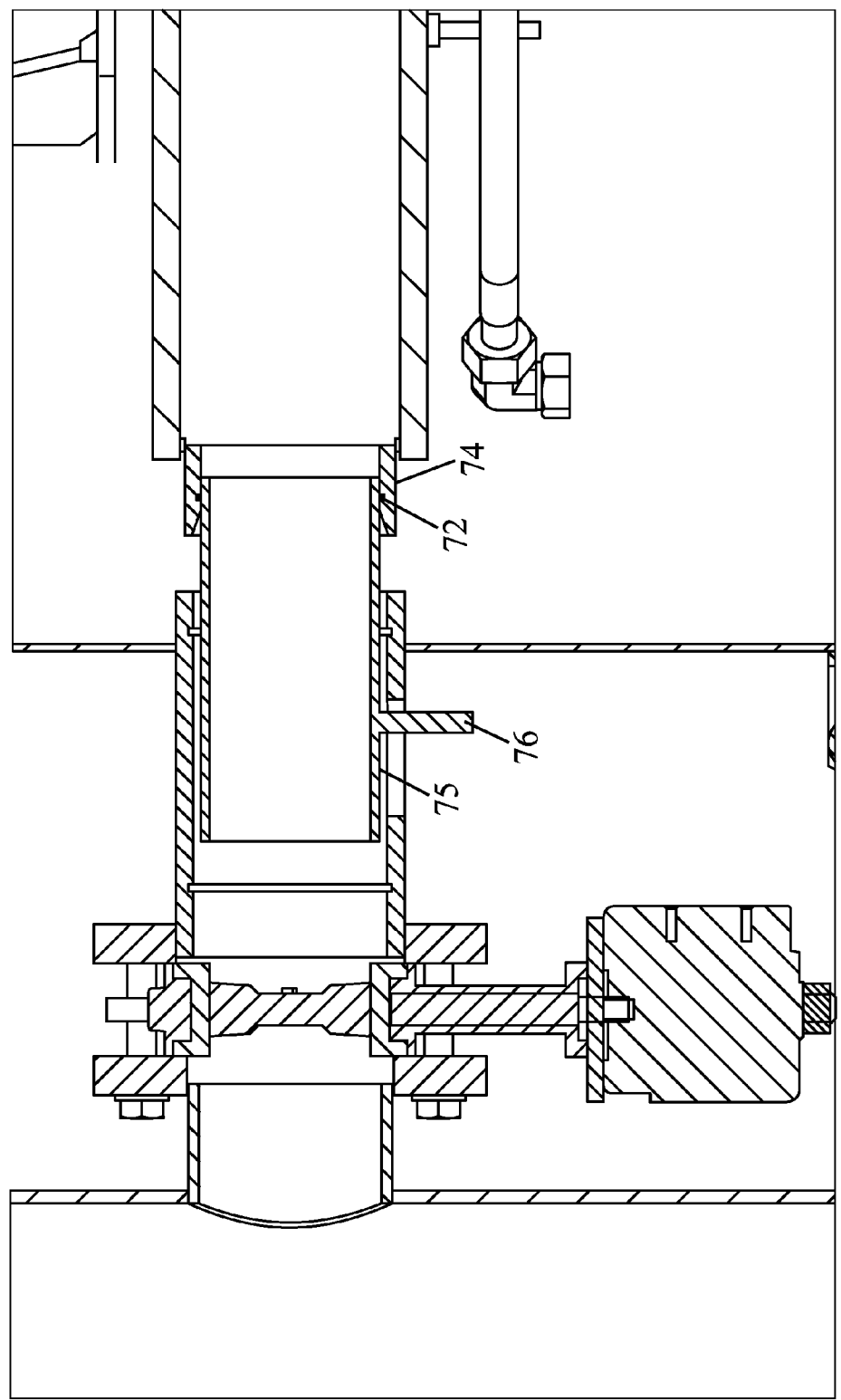
Figure 12:
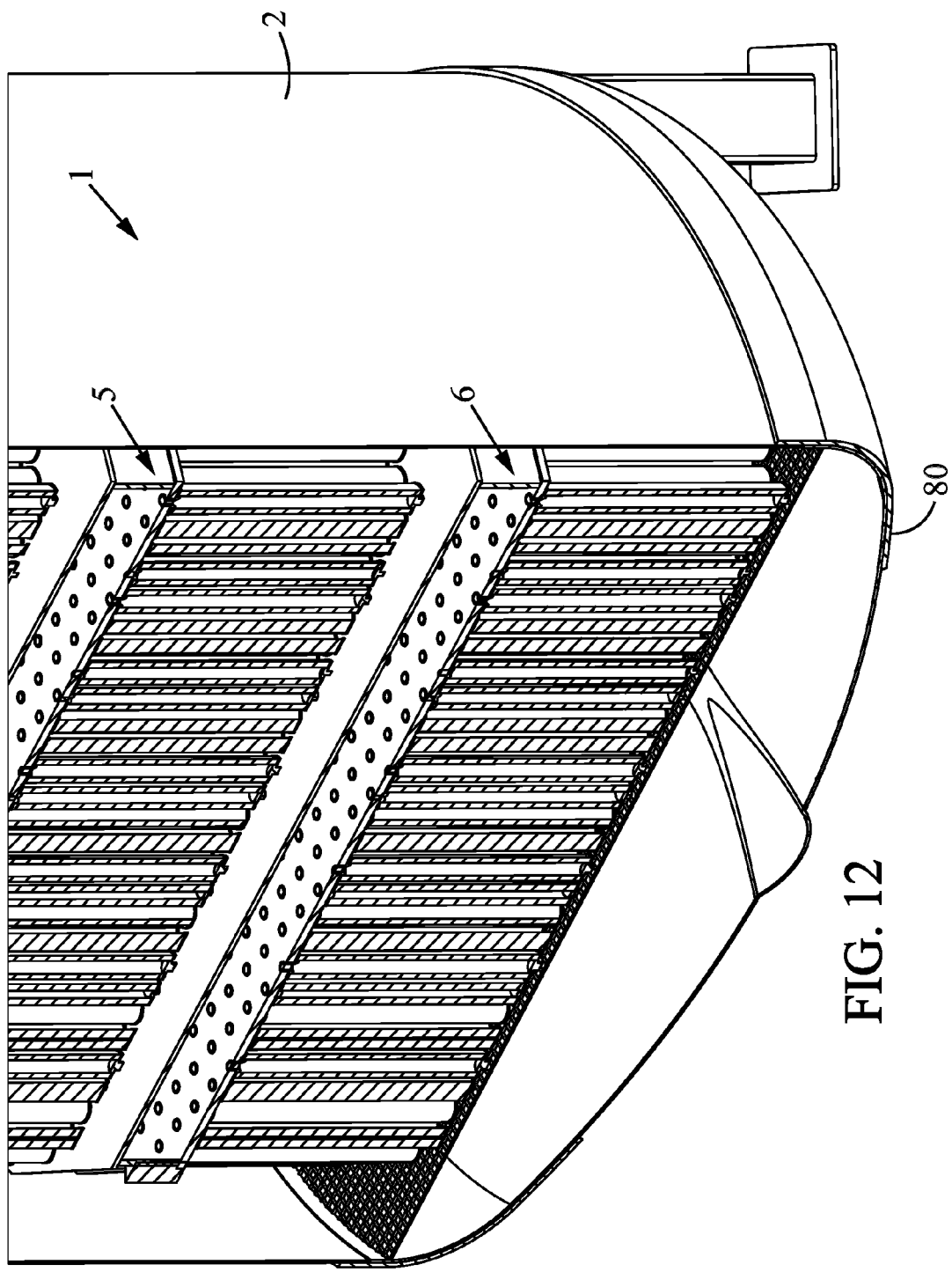

FIG. 9 is a view, according to a horizontal sectional of a filtering device of to the invention according to a second embodiment, FIG. 10 is a view in details of the connector between one of the plate elements and the tank outlet, in the disconnection position of the connector, allowing the lifting and the removal of said plate, FIG. 11 is a view in details of the connector of FIG. 10, in the connection position of the connector, FIG. 12 is a vertical sectional view, in the bottom of the tank, depicting especially a security grid.

We being firstly to describe a filtering device with five plate elements, and as known from the prior art, well-known from the person skilled in the art under the name "Supamic Filter" of the name of its original manufacturer. Such a filtering device comprises, as depicted on FIG. 1, a tank 10', typically cylindrical inside which several "plates" are stacked, removably, referenced 11', 12', 13', 14' and 15', distributed along the tank height, and stacked one on another with feet systems. Each of the plate elements is a hollow element on which a big number of filtering cartridges are secured, in parallel, typically by screwing the upper end of the cartridge on the corresponding threaded part of the plate.

The tank 10' comprises an opening 16' for the dirty oil, inferior and an overflow opening 17', located above the plates. The filtration is carried out through the filtering medium of different cartridges, from the outside to the inside, the oil filtered by the cartridges being collected in the plates, which are a hollow elements, before being conducted to a plate outlet for clean oil. The oil outlets of the different plates are respectively connected in a tight way with openings distributed along the tank height through flange sets 19'. The different filtered oil outlets 18' join in a same vertical conduct.

At the end of the life of the filtering cartridges, their replacement takes place in removing the different plates from the upper opening of the tank, from the highest plate until the inferior plate. Due to flange sets, internal to the tank, each plate can be displaced and removed when the different screws and seals are removed, forcing the operator to carry tedious disassembly operations inside the tank. Similarly, when the cartridges are replaced, when the plates are again placed and stacked inside the tank, the operator has again to tighten the different screws and allowing the compression of the seal ensuring the tight of said connector. These screwing operations, inside the tank, are again tedious and slow down the maintenance operations.

The invention resulted from the inventor's desire to propose a filtering device with plate elements which greatly simplifies these maintenance operations.

Thus the invention concerns an oil filtering device 1, comprising:
a tank 2 comprising an inlet for an oil to be filtered, and a cover 3,
at least one plate element 4, 5, 6, inside said tank, removable, able to be removed from the tank 2 by the upper opening of the cover, said at least one plate element removably receiving filtering cartridges, said plate element, hollow constituting a manifold for the oil filtered by the cartridges of said plate element, said plate element comprising a filtered oil outlet removably connected with a corresponding outlet 21 of the tank by a connector 7. Conventionally, the filtering cartridges can be attached to the underneath of said plate element, by screwing the upper ends of the filtering cartridges into corresponding threaded portions on the underneath of said plate element 4, 5, 6.

According to the invention, said connector 7 comprises a first part 70 (or 74) integral with said at least one plate element and a second part 71 (or 75) integral with the tank, able to mutually cooperate through a seal 72 to ensure a sealing connection between the oil outlet of said plate element 4, 5, 6, and the corresponding outlet of the tank 2. Such an embodiment is depicted on FIGS. 2 to 8, provided as non-limitative example.

According to an alternative embodiment, depicted as non-limitative example on FIGS. 9 to 11, the two parts 74, 75 of the connector 7 can be movable one to another, actuable from the outside of the tank 2, whereas said corresponding plate element is in a stationary position in the tank, able to switch from a first disconnection position (see FIG. 10), allowing the lifting and the removal of said plate element, to a second connection position (see FIG. 11) wherein the two parts 74, 75 cooperate with the seal 72 to ensure a sealing connection between the oil outlet of said plate element and the corresponding outlet of the tank.

Figure 1B:
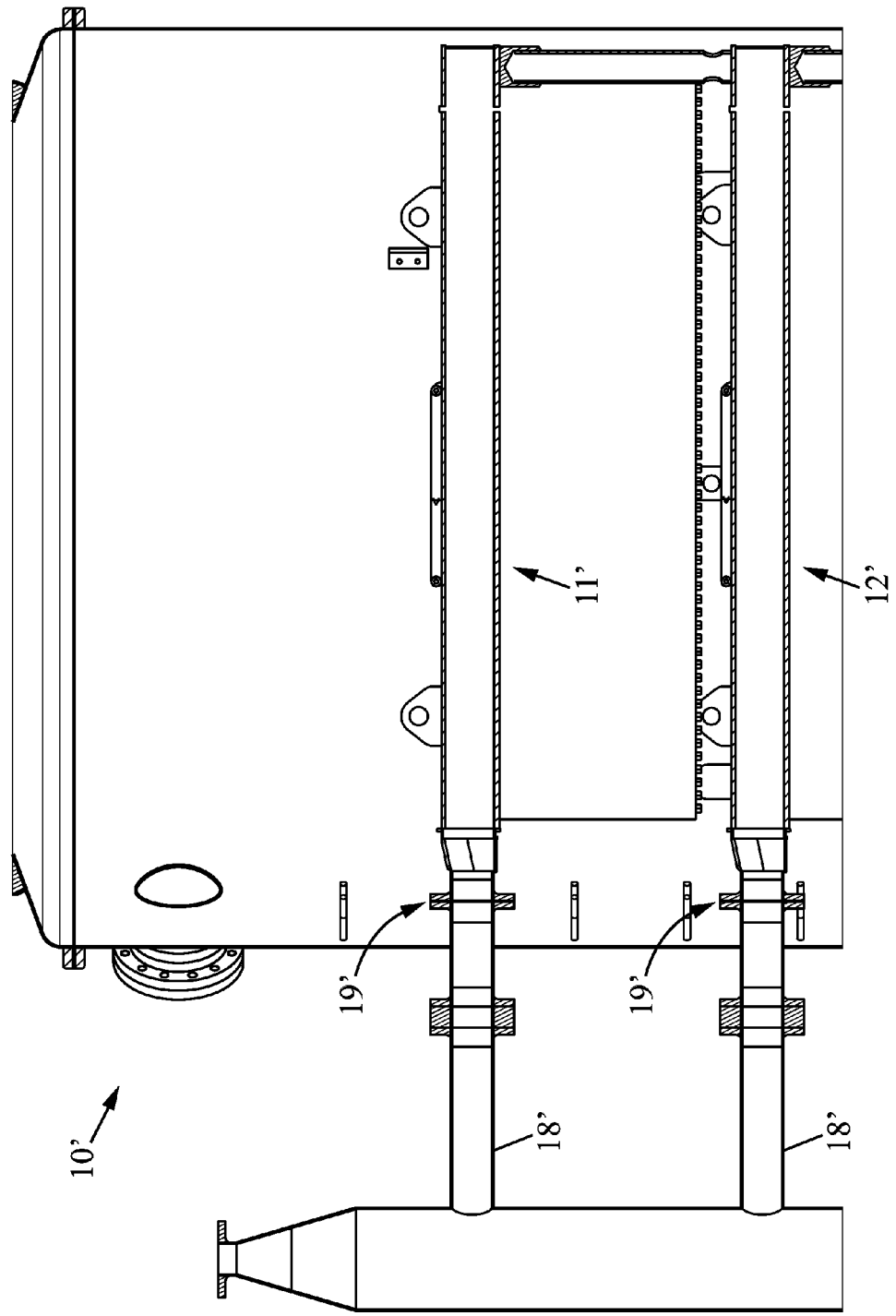
Figure 2:
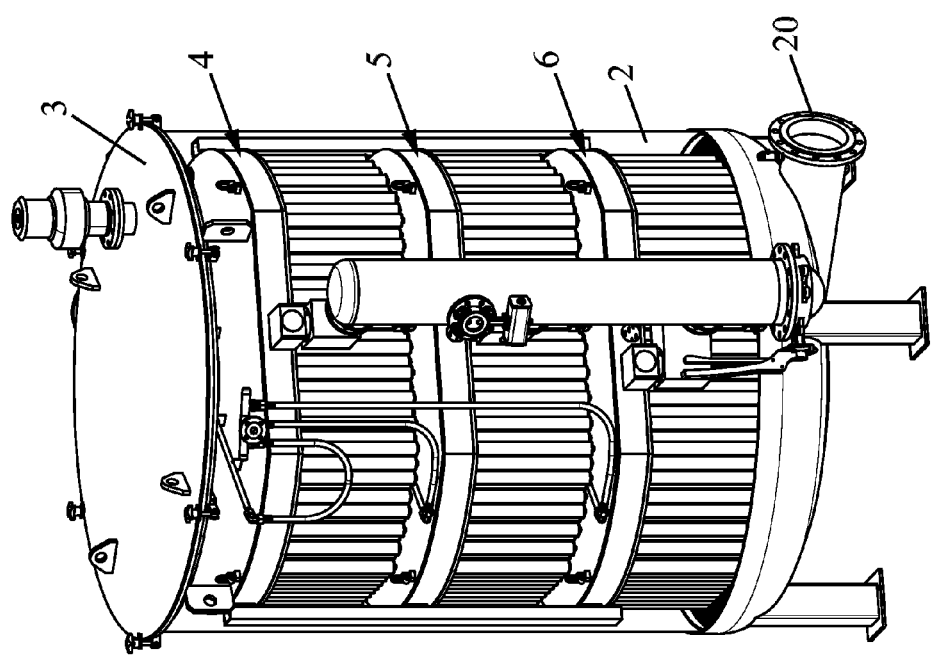

Thus, in both cases, and to the contrary to the prior art depicted on FIG. 1 requiring the screwing of screws, for each plate element, to connect the oil outlet to the corresponding outlet of the tank, the sealing connection of the two parts of the connector can be obtained without an operator intervention, by the vertical displacement, and preferably under action of the mass of said plate element of the first embodiment, and without requiring screwing of screws as in the prior art. In the second embodiment, the displacement between the two parts 74, 75 can be a translation displacement, for example substantially horizontal ensuring the sealing between the two parts 74 and 75.

Advantageously, the operations of removal of the plate element(s) 4, 5, 6 outside the tank, can be carried out with a lifting means and without the operator's intervention inside the tank, especially for unscrewing operations according to the prior art.

Conventionally, the inlet 20 of the tank for the oil to be filtered is preferably positioned in the lower part of the tank, at a level lower than the one of the plate elements 4, 5, 6. The tank may also have an overflow outlet 22 (i.e. an overflow) through which the unfiltered oil can escape, and with a view to being recycled to the inlet of the device 1.

Figure 3:
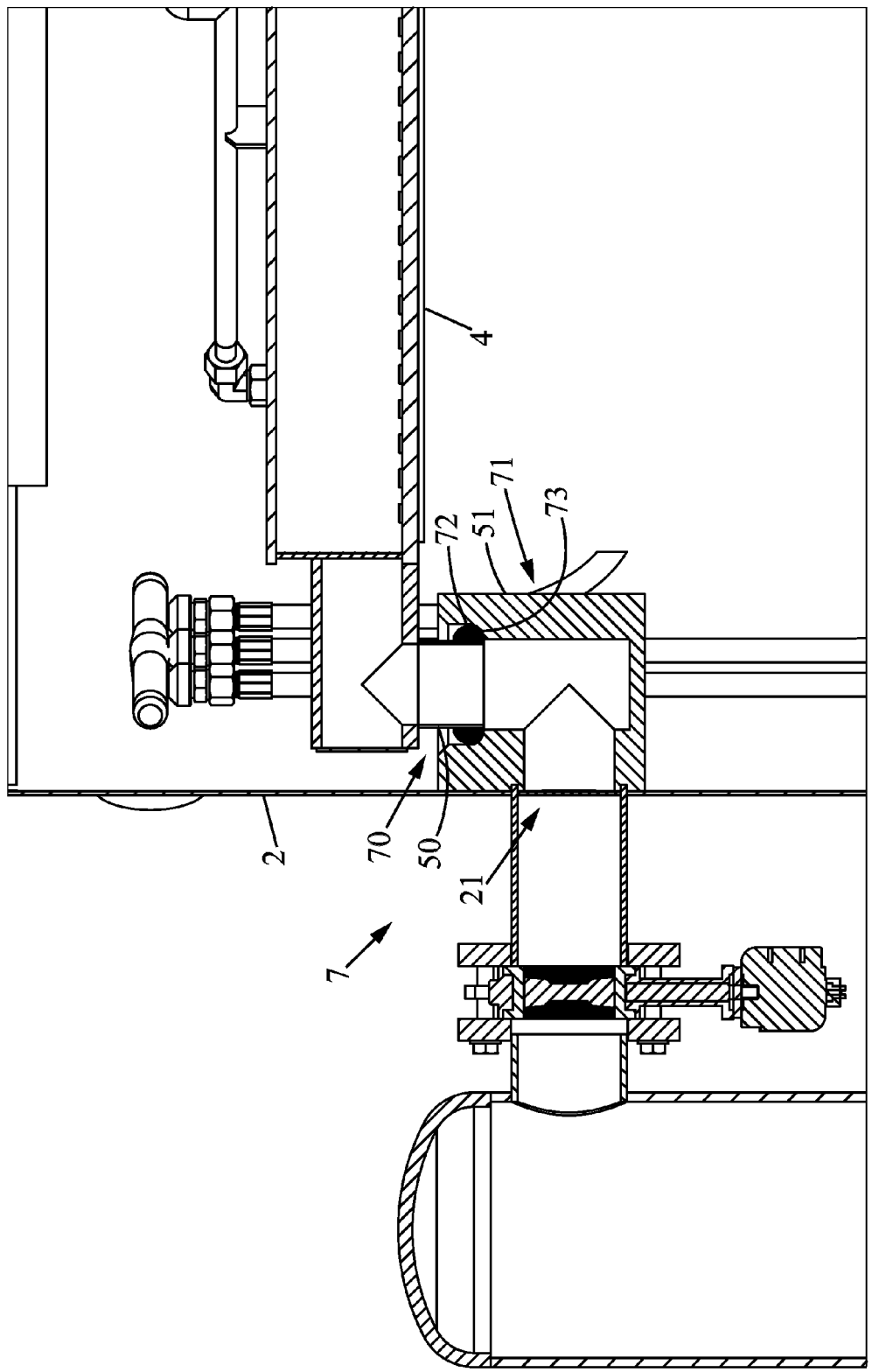

According to the first embodiment depicted as non-limitative example on FIG. 3, said first part 70 and the second part 71 of said connector comprise respectively two conduct sections S0, S1, of vertical axis, interpenetrating, through said seal 72, in said connection position of said connector 7.

The first part 70 integral with said plate element can thus comprise a conduct section S0 vertically extending toward the bottom from the underneath of said plate element 2 having a lower mouth, said second part comprising a conduct section S1 vertically extending toward the top, having an upper mouth.

When the plate element 4 is lowered downwards and according to the embodiment of FIG. 3, the terminal end of the section S0 penetrates into the conduct section S1 of larger diameter and in such a way that, in said connection position of said connector, the two conduct sections S0, S1 cooperate tightly.

In said connecting position, said first part 70 of said integral connector of said plate element is located above said second part 71 of said integral connector of the tank 2. According to one embodiment, the terminal end of the conduct section S0 can be provided with said seal 72, which is a circular seal, in particular an annular seal, integral with this end. Section S1 has further, preferably, at least over a part of its height, a seat 73 making it possible to compress the seal 72 between the two conduct sections S0, S1 and in order to ensure the sealing of the said connection.

According to this embodiment, and more generally, the compression force on the seal ensuring the tight between the first part 70 and the second part 71 of the connector 7 is ensured only by using the mass of the said plate element and the filtering cartridges that said plate element supports. Of course, and preferably, this seal 72 does not support the entire mass of this assembly, the device 1 being able for this purpose to present an adjusting system 15 of mass repartition of said plate element on the seal 72, and the structure of one embodiment of which is further developed in the following.

Figure 5:
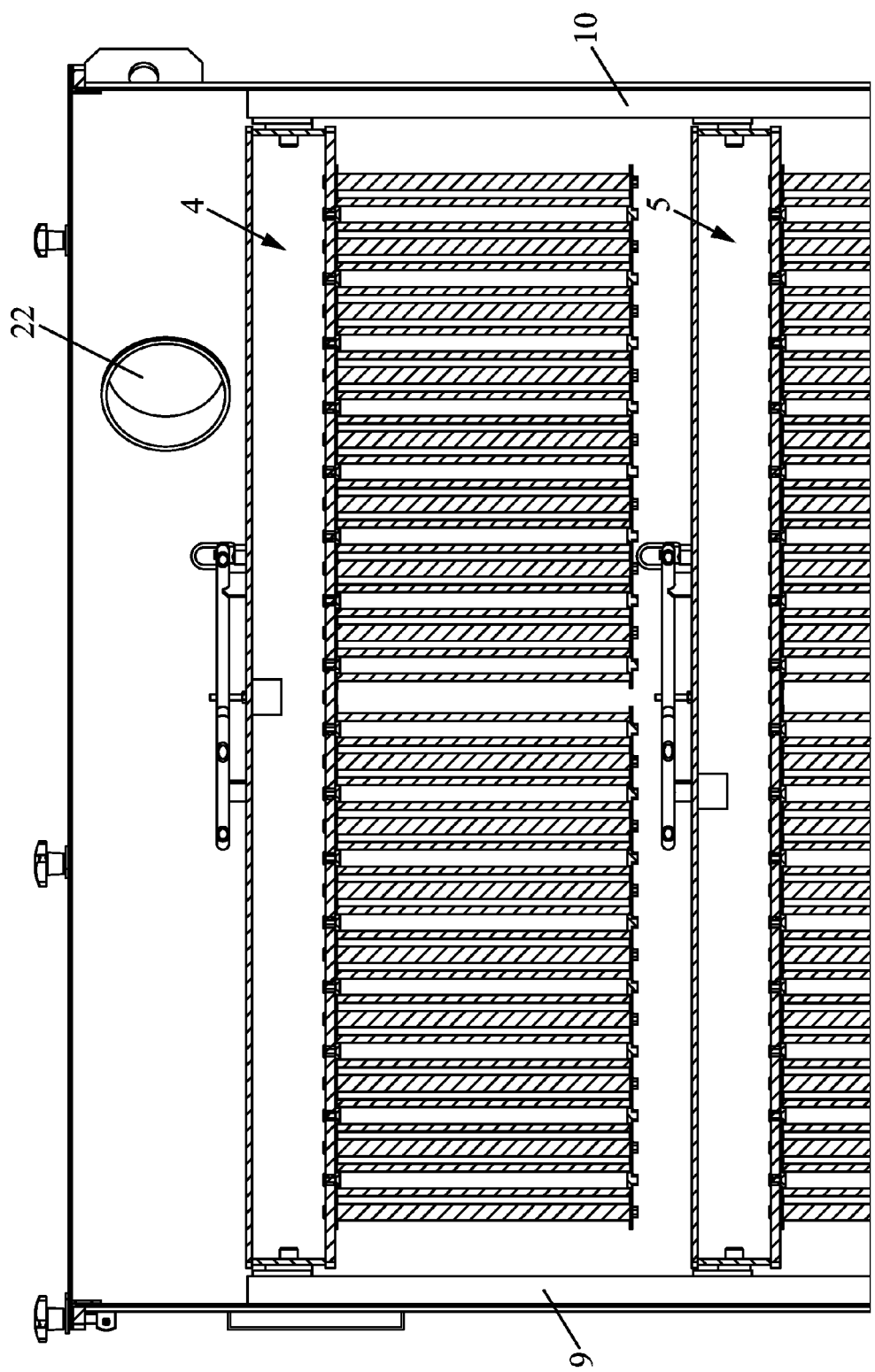
Figure 6:
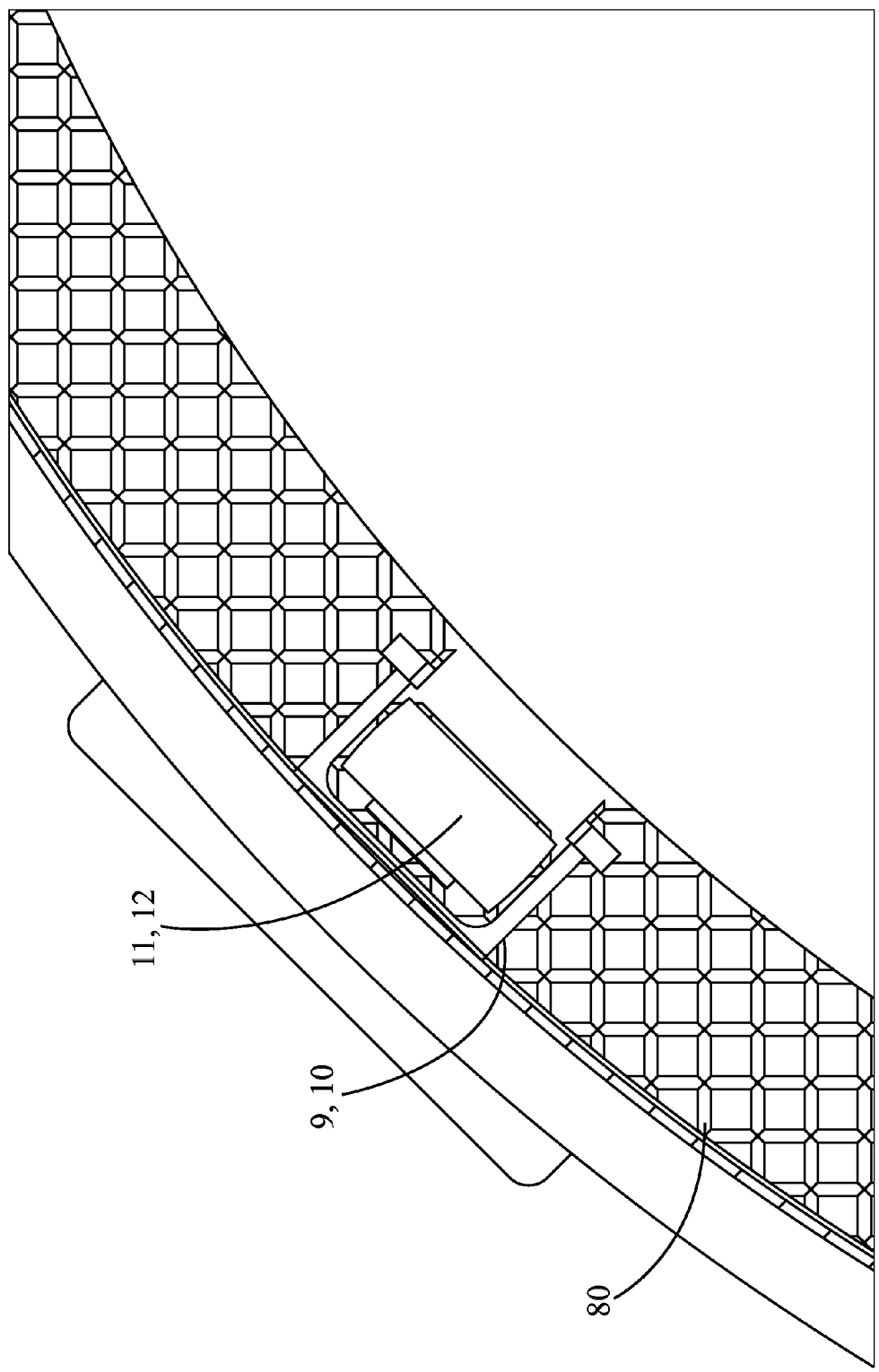
FIG. 6 is a sectional view, according to an horizontal plane, depicting the cooperation between a guide track integral with the tank and a roller integral with a plate element.
Figure 7:
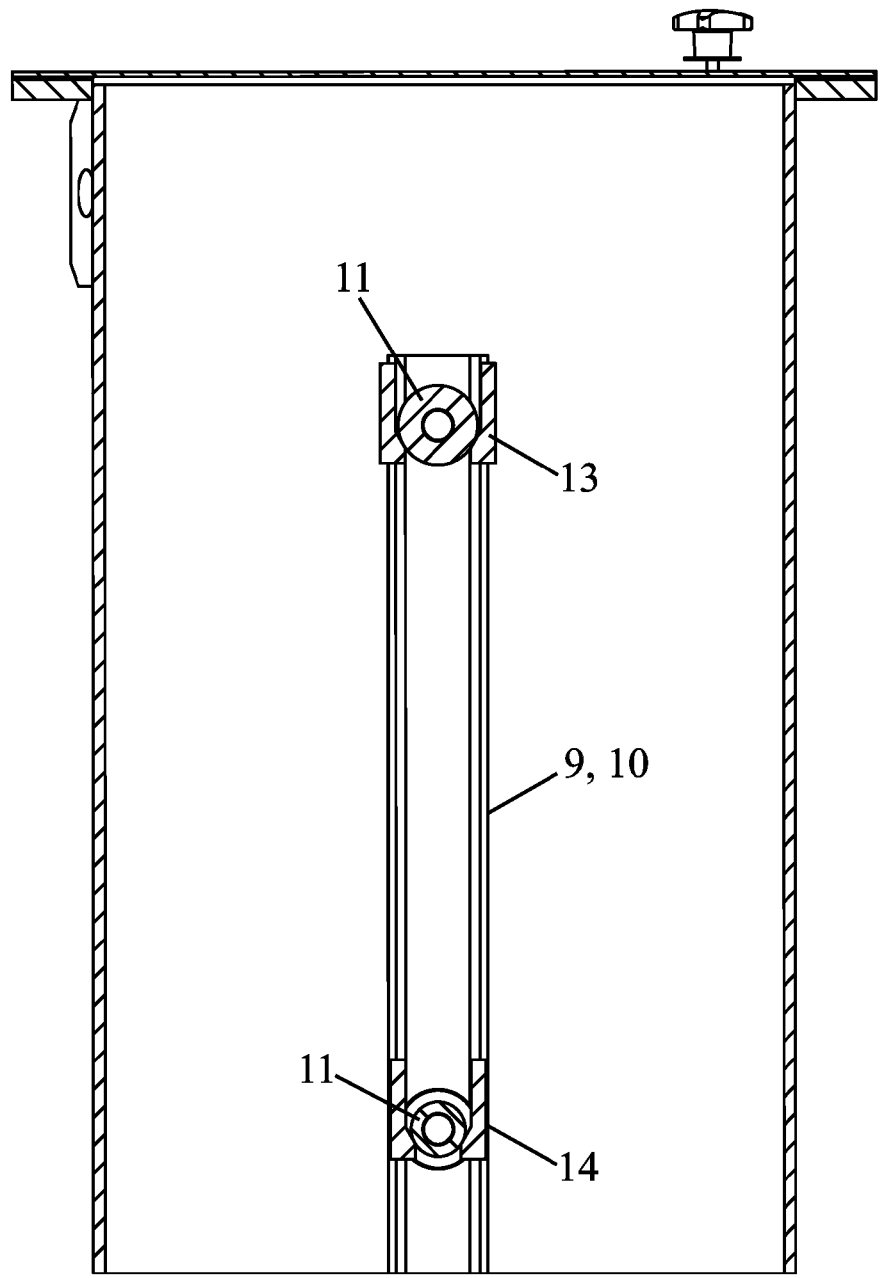
FIG. 7 is a view in details of a guide track, and section reductions with stop function for the rollers.

According to an advantageous embodiment depicted as non-limitative example on FIGS. 5, 6 and 7, the device has vertical guide means arranged between the tank 2 and said plate element 4, 5, 6. These guide means are arranged to ensure the good relative positioning of the two parts 70, 71 of the connector 7 when said plate element is getting down in said tank, and in particular so as to ensure that the two conduct sections S0, S1 will engage correctly, without any angular offset.

According to an embodiment, the guide means comprise several guide tracks 9, 10, oriented vertically in the tank and secured to this last, and guiding parts 11, 12 integral with said plate element, intended to cooperate with said guide tracks. The guide tracks 9, 10 can be of U-shaped section, the guide parts 11, 12 integral with the said plate element 4, 5, 6 comprising rollers intended to be inserted into the internal volume of the guide tracks 9, 10.

According to an embodiment, the guiding parts 11, 12 of the said plate element 4, 5, in particular the rollers, are diametrically opposed on the said plate element and intended to cooperate to the guiding with two corresponding rails 9, 10 of the tank.

According to an embodiment, the device comprises stops 13, 14 intended to stop the vertical stroke of said plate element 4, 5, 6 in said tank 2 and at a corresponding level allowing the sealing connection between the two parts 70, 71 of the connector 7.

According to an embodiment, these stops 13, 14 are located on the guide tracks 9, 10 and so as to engage with the guide parts 11, 12 of the plate elements, in particular said rollers. This configuration allows a pivoting of the said plate element 4, 5, 6 about the axis of the rollers when stopped by the stops 13 14. This possibility of pivoting the plate element can be put to good use in various ways.

According to a first alternative, the mass repartition adjustment device of said plate element on the seal 72 uses this possibility of pivoting and thus comprises an adjustable support system 15 between said plate element 4, 5, 6 and a stationary part 18 of the tank, the system 15 being arranged diametrically opposed on said plate element from said connector 7.

Figure 4:
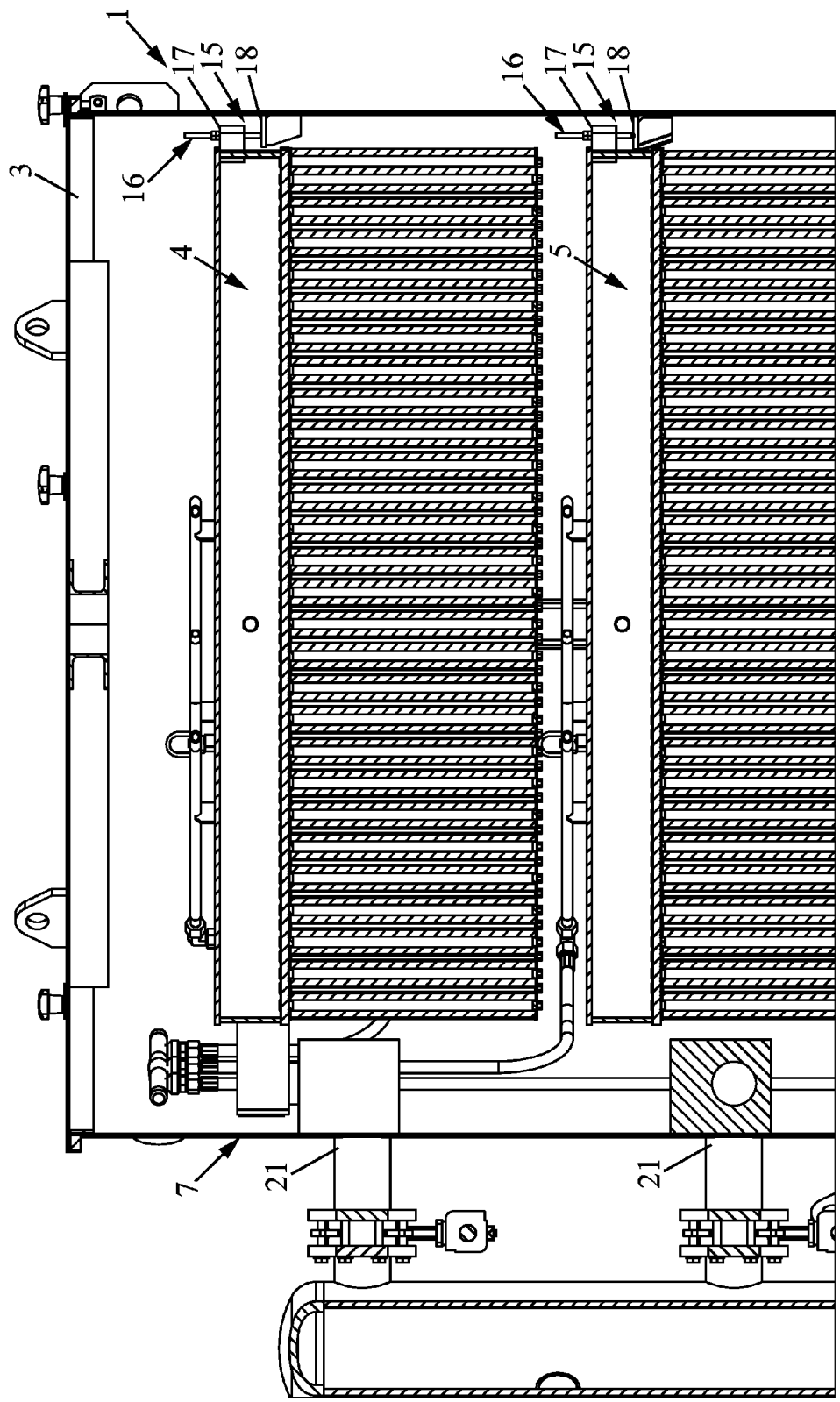

The support system 15 is depicted as non-limitative example on FIG. 4, and comprises a threaded rod 16 cooperating by screwing in a threaded part 17 integral with said plate element.

The lower end of this threaded rod 16 is intended to cooperate in bearing against a stationary part 18 of the tank.

The screwing of the threaded rod, in a first direction, allows the threaded rod to bear more strongly on the stationary part 18 and thus, thanks to the possibility of pivoting about the axis of the rollers, to load the seal 72 diametrically opposed. Conversely, the screwing of the threaded rod in the other direction allows the threaded rod to bear less strongly on the stationary part 18, and thus to discharge the seal 72.

Figure 8:
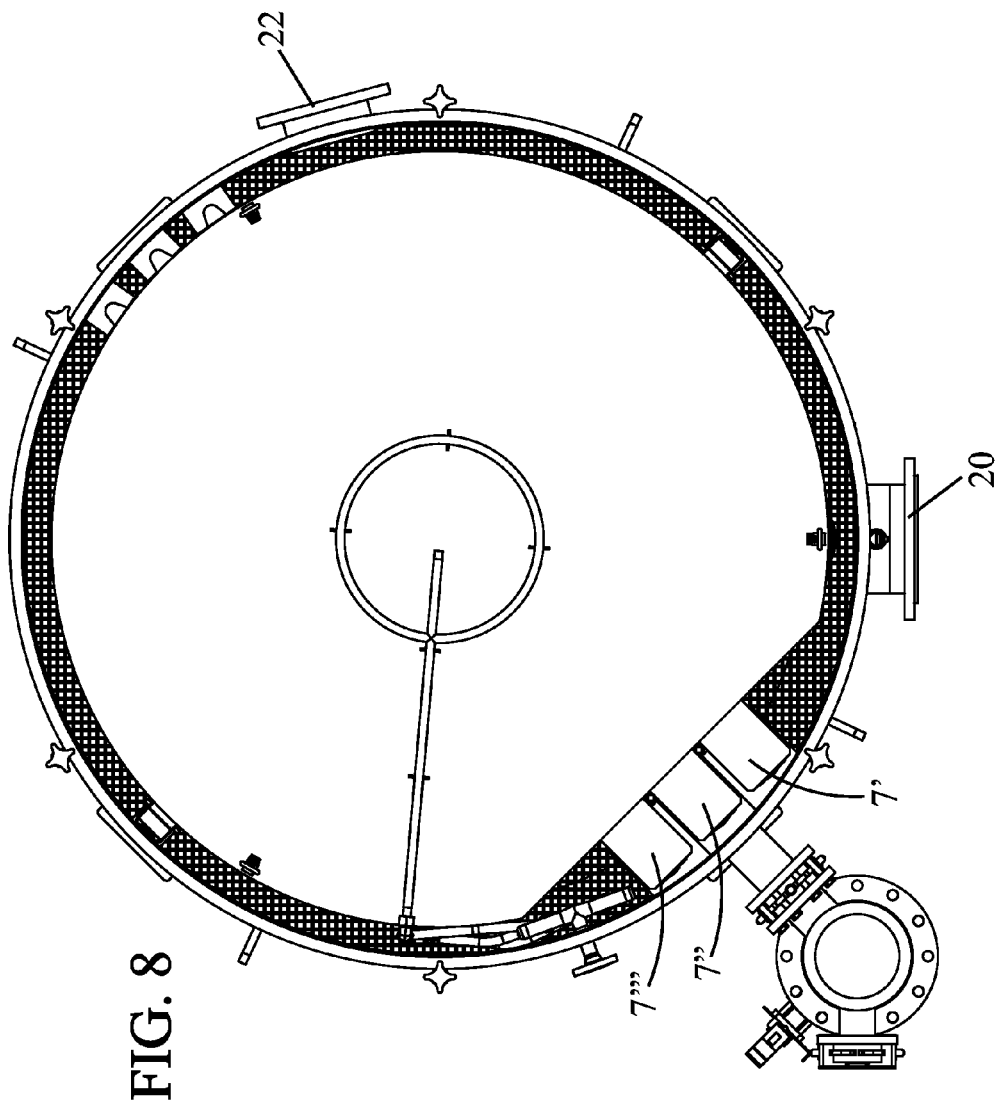
FIG. 8 is a top view of the tank (with the plate elements)

In general, the device can have several plate elements 4, 5, 6 stacked in the internal volume of the tank 2, the connection of each plate element 4, 5, 6 to the corresponding outlet of the tank being made by means through said connector 7 in such a way that the sealing connection of the two parts 70, 71 of the coupling 7, and inversely their disconnection, is ensured according to the invention, for example only by the vertical displacement of the said plate element in said tank according to the first embodiment or through the connector in two parts 74, 75 according to the second embodiment. In order to do this, according to the first embodiment as illustrated in FIG. 8, the positions of the various couplings 7', 7", 7''' corresponding to the different plate elements are preferably angularly offset about the axis of the tank 2. The plate elements 4, 5, 6 can be three in number per device, as a non-limitative example.

According to the first embodiment of such a device with several plate elements, if applicable:
the different plate elements 4, 5, 6 of the different levels share the same guide tracks 9, 10,
the guide parts 11, 12 integral with said plate elements, particularly the rollers, are of increasing dimensions, from said plate element 4 of the highest level, toward said plate element 6 of the lowest level,
the stops 13, 14 intended to stop the stroke of the different plate elements 4, 5, 6 comprise section of reductions, within the guide tracks 9, 10, each of the section of reductions being intended to ensure the locking of a guiding means belonging to a specific plate element and in a way such that a guide part of smaller dimension goes through the section of reduction, without locking said specific plate element.

Such an arrangement is illustrated as a non-limitative example in FIG. 7 for the stops of the upper plate element 4 and of the intermediate level plate element.

For each guide track 9 or 10, the stop 13 for the roller of the upper plate 4 is constituted by a section reduction of said guide track, able to block the descent of said roller of the upper plate element 4. On the other hand, rollers of the intermediate plate element 5 and the rollers of the lower plate element 6, of smaller dimensions, pass through these section reductions, enabling these elements to continue their descent.

Similarly, and for each guide track 9, 10 the stop 14 for the roller of the intermediate plate is constituted by a section reduction of said guide track 9 or 10, able to block the descent of the intermediate plate element 5. On the other hand, the rollers of the lower plate element 6, of smaller dimension, pass through these section reductions, enabling this plate element to continue its descent and until these rollers meet their stop.

Generally (according to the first or second embodiment), the tank of the filtering device can comprise a grid 80, internal to the tank, disposed between the dirty oil inlet 20 and the different plate elements 4, 5, 6 and their cartridges.

The inlet 20 can, outside of filtering operation, be used as an outlet to drain the tank. In this case, the grid 80 allows retaining possible waste (for example pieces of degraded cartridges) during the draining operations and in order to prevent this waste from being aspirated by the pumps and to deteriorate them.

The second embodiment of the invention is illustrated in details, as a non-limitative example in FIGS. 9 to 11.

Thus, the first part 74 of the connector integral with the outlet of said plate element can comprise a conduct section, for example substantially of horizontal axis, terminated by a mouth, rigidly secured to the body of the plate element. The second part 75 of the connector, secured to the tank, can comprise a conduct section, in particular of horizontal axis, intended to penetrate the mouth of the first part 74.

In the disconnected position illustrated in FIG. 10, the second part 75 is in a retracted (i.e. non-penetrating) position, whereas in the position illustrated in FIG. 11, the second part 75 penetrates into the mouth of the first part 74, compressing the seal 72, obtaining a tight connection.

The relative movement between the two parts 74, 75 can be obtained through the second part 75, which can be slidably mounted with respect to a stationary part, in particular in a tube section of larger diameter, with a limited axial stroke to the tank, to switch from the connection position to the disconnection position.

Advantageously, the passage from one position to the other is actuated outside the tank, for example manually by means of a handle 76, according to the depicted embodiment. Obviously, the passage from one position to the other can be automated by any suitable actuator (pneumatic, electric cylinder . . . ) and for the same purpose.

In all cases, the invention allows to carry out the conventional maintenance operations, including the lifting and the removal the plate elements, and advantageously, without requiring tedious unscrewing operations inside the tank.

The invention further concerns a recycling and rolling oil filtering installation of a rolling mill comprising an oil circuit comprising successively:
- a dirty oil tank,
- an oil filtering system comprising several devices 1 according to the invention, and
- a clean oil tank.

Naturally, other embodiments could have been envisaged by the person skilled in the art, without thereby departing from the scope of the invention as defined by the claims hereinafter.

The invention claimed is:

1. An oil filtering device (1), comprising:
a tank (2) comprising an inlet for an oil to be filtered, and a cover (3),
at least one plate element (4, 5, 6), internal to said tank, removable, able to be removed from the tank (2) by the upper opening of the cover, said at least one plate element removably receiving filtering cartridges, said plate element, hollow constituting a manifold for the oil filtered by the cartridges of said plate element, said plate element comprising a filtered oil outlet removably connected with a corresponding outlet (21) of the tank through a connector (7),
wherein said connector (7) comprises a first part (70; 74) integral with said at least one plate element and a second part (71; 75) integral with the tank, able to mutually cooperate through a seal (72) to ensure a sealing connection between the oil outlet of said plate element (4, 5, 6), and the corresponding outlet of the tank,
wherein the two parts (70, 71) of said connector (7) are arranged such that the sealing connection of the two parts (70, 71) of the connector, and on the contrary their disconnection, is ensured only by the vertical displacement of said plate element (4, 5, 6) within said tank (2) or alternatively,
wherein the two parts (70, 71) of said connector (7) are arranged such that the sealing connection of the two parts (70, 71) of the connector, and on the contrary their disconnection, is ensured only by the vertical displacement of said plate element (4, 5, 6) within said tank (2), wherein, in said second connection position of said connector (7) the compression of the seal (72) ensuring the tight between the first part (70) and the second part (71) of the connector is ensured only by use of the mass of said plate element and of the filtering cartridges that it supports, and
wherein said device is having an adjusting device of mass repartition of said plate element on the seal (72).

2. The device according to claim 1, wherein the plate elements are in number of three.

3. The device according to claim 1, having stops (13, 14) intended to stop the vertical stroke of said plate element (4, 5, 6) in said tank and at a corresponding level allowing the sealing connection between the two parts (70, 71) of the connector (7).

4. The device according to claim 3, wherein the device has vertical guide means arranged between the tank (2) and said plate element (4,5,6), arranged to ensure the good relative positioning of the two parts (70, 71) of the connector (7) when said plate element is getting down in said tank,
wherein the guide means comprise several guide tracks (9, 10), oriented vertically in the tank (2) and secured to this last, and guiding parts (11, 12) integral with said plate element, intended to cooperate with said guide tracks,
wherein the guiding parts (11, 12) integral with said plate comprise rollers intended to be inserted in the internal volume of the guide tracks (9, 10),
wherein the rollers are arranged diametrically opposed on said plate element and intended to cooperate with the two guide tracks (9, 10) of said tank, said stops (13, 14) cooperating with the rollers of said plate such to permit a pivoting of said plate element (4, 5, 6) around the roller's axe, and wherein the mass repartition adjustment device of said plate element on the seal (72) uses this possibility of pivoting and comprises an adjustable support system (15) between said plate element and a stationary part of the tank, arranged diametrically opposed on said plate element from said connector (7).

5. The device according to claim 1, wherein the first part (70) and the second part (71) of said connector comprise respectively two conduct sections, of vertical axis, interpenetrating, through said seal (72), in said connection position of said connector (7), and, wherein the first part (70) integral with said plate element (4, 5, 6) comprises a conduct section (S0) vertically extending toward the bottom from the underneath of said plate element (2), having a lower mouth, said second part comprising a conduct section (S1) vertically extending toward the top, having an upper mouth, and such that, in said connection position of said connector (7), the two conduct sections (S0, S1) cooperate tightly, said first part (70) of said integral connector of said plate element being located above said second part (71) of said integral connector of the tank.

6. A recycling and rolling oil filtering installation of a rolling mill comprising an oil circuit comprising successively:
a dirty oil tank,
an oil filtering system comprising one or more devices according to claim 1, and
a clean oil tank.

7. An oil filtering device (1), comprising:
a tank (2) comprising an inlet for an oil to be filtered, and a cover (3),
least one plate element (4, 5, 6), internal to said tank, removable, able to be removed from the tank (2) by the upper opening of the cover, said at least one plate element removably receiving filtering cartridges, said plate element, hollow constituting a manifold for the oil filtered by the cartridges of said plate element, said plate element comprising a filtered oil outlet removably connected with a corresponding outlet (21) of the tank through a connector (7),
wherein said connector (7) comprises a first part (70; 74) integral with said at least one plate element and a second part (71; 75) integral with the tank, able to mutually cooperate through a seal (72) to ensure a sealing connection between the oil outlet of said plate element (4, 5, 6), and the corresponding outlet of the tank, and wherein the two parts (70, 71) of said connector (7) are arranged such that the sealing connection of the two parts (70, 71) of the connector, and on the contrary their disconnection, is ensured only by the vertical displacement of said plate element (4, 5, 6) within said tank (2),
wherein the device has vertical guide means arranged between the tank (2) and said plate element (4,5,6), arranged to ensure the good relative positioning of the two parts (70, 71) of the connector (7) when said plate element is getting down in said tank,
wherein the guide means comprise several guide tracks (9, 10), oriented vertically in the tank (2) and secured to this last, and guiding parts (11, 12) integral with said plate element, intended to cooperate with said guide tracks, and wherein the guiding parts (11, 12) integral with said plate comprise rollers intended to be inserted in the internal volume of the guide tracks (9, 10).

8. The device according to claim 7, having stops (13, 14) intended to stop the vertical stroke of said plate element (4, 5, 6) in said tank and at a corresponding level allowing the sealing connection between the two parts (70, 71) of the connector (7).

9. The device according to claim 8, wherein:
the different plate elements (4, 5, 6) of the different levels share the same guide tracks (9, 10),
the guide parts (11, 12) integral with said plate elements, particularly the rollers, are of increasing dimensions, from said plate element (4) of the highest level, toward said plate element (6) of the lowest level,
the stops (13, 14) intended to stop the stroke of the different plate elements (4, 5, 6) comprise section of reductions, within the guide tracks (9, 10), each of the section of reductions being intended to ensure the locking of a guiding means (11, 12) belonging to a specific plate element and in a way such that a guide part of smaller dimension goes through the section of reduction, without locking said specific plate element.

10. The device according to claim 8, wherein the rollers are arranged diametrically opposed on said plate element and intended to cooperate with the two guide tracks (9, 10) of said tank, said stops (13, 14) cooperating with the rollers of said plate such to permit a pivoting of said plate element (4, 5, 6) around the roller's axe, and wherein the mass repartition adjustment device of said plate element on the seal (72) uses this possibility of pivoting and comprises an adjustable support system (15) between said plate element and a stationary part of the tank, arranged diametrically opposed on said plate element from said connector (7).

11. The device according to claim 7, having several plate elements (4, 5, 6) stacked in the internal volume of the tank (2), the connection of each plate element (4, 5, 6) with the corresponding tank outlet being performed by said connector (7) such that the sealing connection, and conversely their disconnection, is ensured only by the vertical movement of said plate element in said tank, the positions of the different connectors (7', 7", 7''') corresponding to the different plate elements angularly offset around the tank's axe (2).

12. The device according to claim 7, wherein the plate elements are in number of three.

13. A recycling and rolling oil filtering installation of a rolling mill comprising an oil circuit comprising successively:
a dirty oil tank,
an oil filtering system comprising one or more devices according to claim 7, and
a clean oil tank.

14. An oil filtering device (1), comprising:
a tank (2) comprising an inlet for an oil to be filtered, and a cover (3),
at least one plate element (4, 5, 6), internal to said tank, removable, able to be removed from the tank (2) by the upper opening of the cover, said at least one plate element removably receiving filtering cartridges, said plate element, hollow constituting a manifold for the oil filtered by the cartridges of said plate element, said plate element comprising a filtered oil outlet removably connected with a corresponding outlet (21) of the tank through a connector (7), wherein said connector (7) comprises a first part (70; 74) integral with said at least one plate element and a second part (71; 75) integral with the tank, able to mutually cooperate through a seal (72) to ensure a sealing connection between the oil outlet of said plate element (4, 5, 6), and the corresponding outlet of the tank, and wherein the two parts (70, 71) of said connector (7) are arranged such that the sealing connection of the two parts (70, 71) of the connector, and on the contrary their disconnection, is ensured only by the vertical displacement of said plate element (4, 5, 6) within said tank (2), wherein the two parts (70, 71) of said connector (7) are arranged such that the sealing connection of the two parts (70, 71) of the connector, and on the contrary their disconnection, is ensured only by the vertical displacement of said plate element (4, 5, 6) within said tank (2), wherein, in said second connection position of said connector (7) the compression of the seal (72) ensuring the tight between the first part (70) and the second part (71) of the connector is ensured only by use of the mass of said plate element and of the filtering cartridges that it supports, and wherein the first part (70) and the second part (71) of said connector comprise respectively two conduct sections, of vertical axis, interpenetrating, through said seal (72), in said connection position of said connector (7), and, wherein the first part (70) integral with said plate element (4, 5, 6) comprises a conduct section (S0) vertically extending toward the bottom from the underneath of said plate element (2), having a lower mouth, said second part comprising a conduct section (S1) vertically extending toward the top, having an upper mouth, and such that, in said connection position of said connector (7), the two conduct sections (S0, S1) cooperate tightly, said first part (70) of said integral connector of said plate element being located above said second part (71) of said integral connector of the tank.

15. The device according to claim 14, wherein the device has vertical guide means arranged between the tank (2) and said plate element (4,5,6), arranged to ensure the good relative positioning of the two parts (70, 71) of the connector (7) when said plate element is getting down in said tank.

16. The device according to claim 14, having stops (13, 14) intended to stop the vertical stroke of said plate element (4, 5, 6) in said tank and at a corresponding level allowing the sealing connection between the two parts (70, 71) of the connector (7).

17. The device according to claim 14, wherein the plate elements are in number of three.

18. A recycling and rolling oil filtering installation of a rolling mill comprising an oil circuit comprising successively:
a dirty oil tank,
an oil filtering system comprising one or more devices according to claim 14, and
a clean oil tank.

* * * * *

UNITED STATES PATENT AND TRADEMARK OFFICE
CERTIFICATE OF CORRECTION

PATENT NO. : 10,239,000 B2
APPLICATION NO. : 15/512626
DATED : March 26, 2019
INVENTOR(S) : David Sequeira, Cedric Bassez and Conrad Ernst De La Graete Page 1 of 1

It is certified that error appears in the above-identified patent and that said Letters Patent is hereby corrected as shown below:

On the Title Page

Left column:
"(73) Assignee: FIVES DMS, Moyelles-les-Seclin (FR)"
Should appear as:
--(73) Assignee: FIVES DMS, Noyelles-les-Seclin (FR)--.

Signed and Sealed this
Twenty-fifth Day of June, 2019

Andrei Iancu
*Director of the United States Patent and Trademark Office*